US012784340B2

(12) United States Patent
Tananaev

(10) Patent No.: US 12,784,340 B2
(45) Date of Patent: Nov. 3, 2026

(54) METHOD FOR GENERATING A REPRESENTATION OF THE SURROUNDINGS

(71) Applicants: CARIAD SE, Wolfsburg (DE); ROBERT BOSCH GmbH, Stuttgart (DE)

(72) Inventor: Denis Tananaev, Sindelfingen (DE)

(73) Assignees: CARIAD SE, Wolfsburg (DE); ROBERT BOSCH GmbH, Stuttgart (DE)

( * ) Notice: Subject to any disclaimer, the term of this patent is extended or adjusted under 35 U.S.C. 154(b) by 271 days.

(21) Appl. No.: 18/598,912

(22) Filed: Mar. 7, 2024

(65) Prior Publication Data

US 2024/0303919 A1 Sep. 12, 2024

(30) Foreign Application Priority Data

Mar. 8, 2023 (DE) ......................... 102023105792.8

(51) Int. Cl.
*G06T 17/00* (2006.01)
*G06T 7/11* (2017.01)

(52) U.S. Cl.
CPC ................ *G06T 17/00* (2013.01); *G06T 7/11* (2017.01); *G06T 2207/20081* (2013.01); *G06T 2207/20084* (2013.01)

(58) Field of Classification Search
CPC . G06T 17/00; G06T 7/11; G06T 2207/20081; G06T 2207/20084; G06V 10/82; G06V 20/56; G06V 20/58; G06V 10/764; G06V 10/766; G06N 20/00
See application file for complete search history.

(56) References Cited

U.S. PATENT DOCUMENTS

| | | | | |
|---|---|---|---|---|
| 7,667,581 B2 * | 2/2010 | Fujimoto | ............. | G06V 20/588 340/436 |
| 10,489,691 B2 * | 11/2019 | Schrier | .................. | G08G 1/166 |
| 11,842,546 B2 * | 12/2023 | Rotker | ................. | G06N 3/0464 |

(Continued)

OTHER PUBLICATIONS

Hernandez-Juarez et al., "Slanted Stixels: A way to represent steep streets" International Journal of Computer Vision (Oct. 2, 2019).

(Continued)

*Primary Examiner* — Vijay Shankar
(74) *Attorney, Agent, or Firm* — MARSHALL, GERSTEIN & BORUN LLP

(57) ABSTRACT

The present method generates a three-dimensional representation of surroundings using an end-to-end convolutional neural network. A captured image is subdivided into multiple vertical columns, which the model processes to parameterize multiple three-dimensional stixels for each column. By providing at least two stixels per column, the system captures a comprehensive environment, including elevated objects like barriers or tunnels. The stixels may be designed as slanted stixels, defined by bottom and top points with associated depth information and semantic classes. This efficient architecture enables high-resolution environmental mapping suitable for autonomous vehicle navigation on embedded hardware, effectively reducing the reliance on separate, computationally intensive depth estimation and semantic segmentation processes.

11 Claims, 5 Drawing Sheets

(56) References Cited

U.S. PATENT DOCUMENTS

Figure 1A:
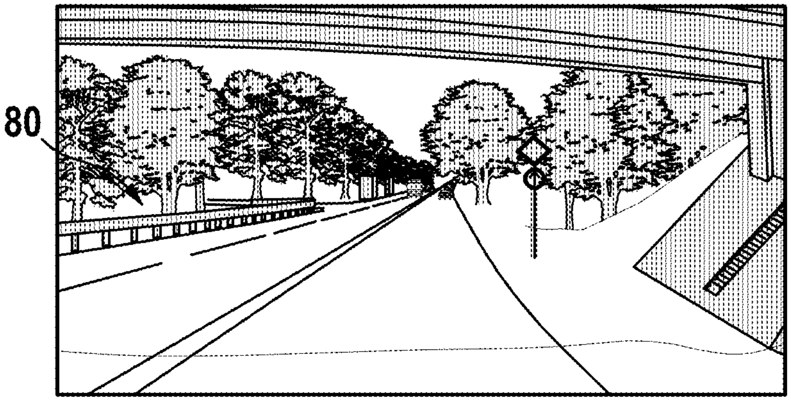

| | | | | |
|---|---|---|---|---|
| 12,148,220 | B2 * | 11/2024 | Drost | G06V 10/82 |
| 2016/0217335 | A1 * | 7/2016 | Levi | G06V 10/454 |
| 2022/0366176 | A1 * | 11/2022 | Rotker | G06F 18/25 |

OTHER PUBLICATIONS

Cordts et al., "Object-Level Priors for Stixel Generation," GCPR 2014, LNCS 8753, 173-183 (2014).

Schneider et al., "Semantic Stuxel: Depth is Not Enough," 2016 IEEE Intelligent Vehicles Symposium (IV), Gothenburg, Sweden (Jun. 19-22, 2016).

* cited by examiner

METHOD FOR GENERATING A REPRESENTATION OF THE SURROUNDINGS

This application claims the benefit of German application DE 10 2023 105 792.8 (filed on Mar. 8, 2023), the entirety of which is incorporated by reference herein.

The invention relates to a method for generating a representation of the surroundings, and a method for training a machine learning model for this purpose. The invention further relates to a machine learning model, a computer program, and a device for this purpose.

PRIOR ART

The generic representation of the 3D surroundings for autonomous driving and robotics is a key challenge for computer vision. Although deep learning-based algorithms exist for the semantic segmentation and depth calculation of monocular and stereo camera estimations, they are very complex with regard to the necessary computing resources, and require extensive post-processing, for example. Therefore, these approaches are often not suitable for highly autonomous systems such as self-driving vehicles or mobile robotics.

So-called 3D stixels and slanted stixels are a type of representation of an environmental setting known from the prior art, which represent the surroundings of a robot or vehicle as a discrete set of object- or surface-based strips. The stixels may often be easily fused using occupancy grid fusion, or linked and tracked using dynamic fusion algorithms (Kalman filters, for example).

A conventional approach for slanted stixels is disclosed in Juarez et al., "Slanted Stixels: A way to represent steep streets," arXiv:1910.01466 (downloadable at https://arxiv.org/abs/1910.01466). However, a 3D representation such as slanted stixels requires computation of the depth, and semantic segmentation, which makes it more difficult to carry out this approach on embedded devices.

In addition, end-to-end approaches for a CNN are found in

- Levi et al., "StixelNet: A Deep Convolutional Network for Obstacle Detection and Road Segmentation," pages 109.1-109.12, BMVC 2015, DOI: https://dx.doi.org/10.5244/C.29.109, downloadable at http://www.bmva.org/bmvc/2015/papers/paper109/paper109.pdf, and
- Garnett et al., "Real-time category-based and general obstacle detection for autonomous driving," ICCV 2017, downloadable at https://openaccess.thecvf.com/content_ICCV_2017_workshops/papers/w3/Garnett_Real-Time_Category-Based_and_ICCV_2017_paper.pdf.

However, only individual stixels for each column can be determined, which for full self-driving scenarios or autonomous navigation may not be adequate, since only the closest objects or surfaces are represented.

DISCLOSURE OF THE INVENTION

The subject matter of the invention relates to a method, a training method, a machine learning model, a computer program, and a device having the features as described and claimed herein. Further features and details of the invention result from the respective subclaims, the description, and the drawings. Of course, features and details that are described in conjunction with the method according to the present invention also apply in conjunction with the training method according to the invention, the machine learning model according to the invention, the computer program according to the invention, and the device according to the invention, and vice versa in each case, so that with regard to the disclosure, mutual reference is or may always be made to the individual aspects of the invention.

The subject matter of the invention relates in particular to a method for generating a representation of the surroundings. The method may comprise the following steps, which are preferably carried out in succession and/or repeatedly:

- providing at least one image that results from a recording by an image detection device and that represents objects and/or surfaces in the surroundings of the image detection device, preferably of a vehicle, wherein the (at least one or exactly one) provided image may be subdivided into multiple image columns,
- generating the representation of the surroundings, wherein for this purpose multiple three-dimensional stixels for each image column of the provided image may be parameterized, preferably determined, for representing the objects and/or surfaces in three-dimensional space.

It may be provided that the generation of the representation of the surroundings takes place using a model, preferably a machine learning model such as a neural network, and preferably a convolutional neural network (CNN), which uses the (at least one or exactly one) provided image as input. The generation of the representation of the surroundings and in particular the parameterization of the stixels end-to-end advantageously take place using the model. In contrast to conventional approaches, which cannot provide multiple 3D stixels for each column of the image, according to the invention a possibly complete 3D surroundings may be represented, and the need for generally used semantic segmentation and depth estimation approaches may thus be replaced or at least reduced. A further possible advantage is the reduction in the technical complexity, for example for complicated embedded hardware, since the proposed approach is very efficient, and in particular is able to simultaneously maintain the functionality of the computationally costly image processing approaches (such as semantic segmentation or depth estimation). The input of the model may be, for example, the image in the form of an RGB image. The output of the model may include, for example, the stixels and a free space. The stixels may represent the height from the bottom point to the top point of the nearest obstacle, and for this purpose may be appropriately parameterized. In addition, the stixels may possibly obtain a class label and the distance from this obstacle. In addition, the free space may also be represented by stixels.

The at least one image may be provided, preferably determined, for example by processing the at least one image as digital input. Similarly, the at least one image may be designed as at least one digital image and may thus include digital data. The image may have been obtained, for example, via an interface of an electronic image sensor, in particular by means of analog-digital conversion. This means that the at least one provided image from a recording may result using an image detection device. The method steps and preferably the provision of the at least one image may be carried out using an electronic data processing device and/or a computer program, optionally, at least in part, also within the image detection device itself.

The representation of the surroundings may include the plurality of stixels that are able to provide an efficient representation of the objects and/or surfaces in the surroundings. "Multiple stixels" for each image column may be understood to mean that at least two stixels are provided for each image column. The stixels may be parameterized with the depth of these objects or surfaces as a function of these objects and/or surfaces that are represented in the image column in question. In particular, in this way an object or a surface may be represented for each stixel and image column. Similarly, multiple objects or surfaces for each image column may also be represented by using multiple stixels for each image column. If in the individual case there are fewer objects or surfaces than stixels in an image column, the remaining stixels may be left empty.

Furthermore, within the scope of the invention it may be provided that the model is designed as a machine learning model, in particular an end-to-end machine learning model, preferably as a neural network, preferably as a convolutional neural network. The invention thus provides in particular an end-to-end CNN-based approach for representing the surroundings, using multiple 3D stixels. The proposed approach is thus able to provide slanted 3D stixel information, and may replace or at least reduce the need for complicated computation methods such as semantic segmentation or depth estimation.

Each stixel may represent an object and/or a surface in the surroundings, in particular of an ego vehicle and/or robot. A slanted stixel may be understood to mean a stixel with which more than one piece of depth information is associated, and which therefore has a three-dimensional design. In other words, the stixel may be defined by a top point and a bottom point, with which a piece of depth information for different depths may be associated in each case (then also referred to as a depth point). This stixel thus extends "at a slant" in the depth direction. The different depths result, for example, from a distance of the object or of the surface in the surroundings, starting from the vehicle having the image detection device, i.e., the ego vehicle or the robot.

Moreover, it is conceivable for the three-dimensional stixels to be designed as slanted stixels. The particular image column may extend across multiple pixels of the provided image in the horizontal direction of the provided image. In the vertical direction of the provided image, at least two or at least three or at least four or at least five or at least 10 or at least 100 stixels may be provided for each image column. The number of stixels may depend on the desired depth of detail with which the surroundings of the image detection device or of the ego vehicle are to be represented. The model may have been correspondingly trained to allow the slanted stixels to be determined. According to the training method, the end-to-end training of multiple 3D stixels for each column for a single camera image may be made possible by the invention. According to a further advantage, the method may be used for strictly camera systems, without the need for costly 3D sensors (lidar, for example). The number of stixels for each image column may be changeable during the training in order to scale the method for different requirements for computing power, for example for use with different hardware. An advantage may also result from the flexibility of the invention, since by varying the predetermined number of stixels for each image column, various objects may be represented which are suitable for various scaling variants of the hardware (low-cost hardware, average costs, high costs), while the same algorithmic approach is maintained for all variants.

Within the scope of the invention, it may preferably be provided that the parameterization of the stixels takes place by defining the particular stixel by a bottom point and a top point, to which a piece of depth information concerning a distance of the object represented by the stixel and/or of the surface represented by the stixel is assigned in each case. A stixel may be defined, for example, by the parameters of the stixel bottom point and/or stixel top point and/or depth and/or semantic classes.

Furthermore, it is optionally provided that the steps are carried out for further provided images that result from a recording of further regions of the surroundings by further image detection devices in order to expand the representation of the surroundings to the further regions. A single multistixel network may optionally be used on multiple image detection devices such as cameras, and may represent a complete 360-degree 3D surroundings, with a fraction of the computations that are necessary in segmentation and depth estimation approaches. In addition, modeling of elevated objects such as barriers and tunnels may be made possible. The invention thus allows in particular a precise reconstruction of the entire 3D surroundings, which allows cost-efficient autonomous systems with full autonomous functionality. In self-driving automobile systems or in robotics, by use of the invention a complete 3D representation may be provided, which may be necessary to allow reliable and safe navigation. The invention enables this functionality, for example for a camera-based system on embedded edge devices.

It is also conceivable for the model to comprise an output layer for each parameter of the particular stixel, preferably for a bottom point and/or a top point and/or for a piece of depth information for the particular point and/or a stixel size and/or at least one semantic class of the particular stixel, wherein at least one of the following output layers is provided:

- an output layer for parameterization of the bottom point of the stixel,
- an output layer for parameterization of the depth information for the bottom point,
- an output layer for parameterization of the depth information for the top point of the stixel,
- an output layer for parameterization of the stixel size of the stixel,
- an output layer for parameterization of the at least one semantic class of the stixel.

Within the scope of the invention, a stixel may also be referred to as a depth representation. In particular in computer vision, a stixel is also understood to mean a superpixel representation of pieces of depth information in an image in the form of a vertical stick (also referred to as a strip). This representation allows an approximation of the closest obstacles within a certain vertical segment of the setting (see Badino, Herndn; Franke, Uwe; Pfeiffer, David (2009), "The stixel world—A compact medium level representation of the 3D world," Joint Pattern Recognition Symposium). Stixels may also be provided as thin vertical rectangles that represent a detail of a vertical surface belonging to the closest obstacle in the observed setting, i.e., in the surroundings. Stixels allow a drastic reduction in the quantity of information that is needed for representing a setting with such problems. A stixel may be characterized by multiple parameters: a vertical coordinate, the height of the strip, and the depth. Slanted stixels may be expanded by at least one parameter, in particular by a further depth at a different vertical coordinate. The input for the stixel estimation may be a dense depth map, which may be computed from the stereo disparity or by other means.

It is possible, based on an at least semiautomated evaluation of the generated representation of the surroundings, to control, preferably in an at least semiautomated manner and preferably autonomously, an at least semiautonomous robot, in particular a vehicle. It is likewise conceivable for the image detection device to be designed as a camera. In particular, it may be provided that, based on an automated evaluation of the representation of the surroundings, a vehicle is automatedly and preferably autonomously controlled, wherein the (particular) image detection device in the form of a camera is mounted on the vehicle. It is possible for the vehicle to be designed as a motor vehicle and/or passenger automobile and/or autonomous vehicle. The vehicle may have a vehicle unit, for example for providing an autonomous driving function and/or a driver assistance system. The vehicle unit may be designed, at least in part, to automatically control and/or accelerate and/or brake and/or steer the vehicle.

The subject matter of the invention further relates to a method for training a machine learning model for generating a representation of the surroundings. The method may also be referred to as a training method, and the machine learning model may optionally be trained end-to-end. In addition, the trained machine learning model may be used as the model for generating the representation of the surroundings in the further method according to the invention. The end-to-end training is a concept in artificial intelligence or machine learning. In particular, for a result such as the generation of the representation of the surroundings, intermediate steps necessary for this purpose may be integrated into a unified machine learning model. The machine learning model may be designed as an artificial neural network.

Traditionally, multiple layers of the artificial neural network are utilized for various intermediate steps to obtain an end result. "End-to-end" may possibly refer to the fact that the machine learning model depicts the entire target system, and thus bypasses the intermediate steps. During an end-to-end training, in particular the system necessary for achieving the result, preferably the machine learning model, may be trained from the input data (such as the images) up to the outputs, such as the representation of the surroundings, without the intermediate steps (such as feature engineering steps or a division of functions) being necessary.

For the training, preferably end-to-end training, for example input data such as the images may be provided, a forward propagation through the network may take place to generate predictions based on the provided input data, an error function may be computed based on the predictions and a desired result, and a backward propagation through the network may take place to adapt the weightings and/or bias values of the network. For this purpose, the network may have an input layer, one or more hidden layers, and an output layer. The desired result may include annotation data, for example, which indicate desired stixels for the input data.

According to a first training step, an image may be provided which represents objects and/or surfaces in the surroundings. According to a second training step, the training of the machine learning model may then be carried out, in which the provided image is used as input for the machine learning model in order to train the machine learning model for an output of multiple three-dimensional stixels for each image column of the provided image, the stixels representing the objects and/or surfaces in three-dimensional space. In addition, it is conceivable to use an ordinal regression for the parameterization of the particular stixels, preferably to determine a bottom point and/or top point of the stixel.

Furthermore, the subject matter of the invention relates to a machine learning model that has been trained according to the training method according to the invention. The machine learning model according to the invention thus yields the same advantages as described in detail with regard to a method according to the invention.

Moreover, the subject matter of the invention relates to a computer program, in particular a computer program product, that includes commands which, when the computer program is executed by a computer, prompt the computer to carry out the method according to the invention. The computer program according to the invention thus yields the same advantages as described in detail with regard to a method according to the invention.

In addition, the subject matter of the invention relates to a device for data processing which is configured to carry out the method according to the invention. For example, a computer that executes the computer program according to the invention may be provided as the device. The computer may include at least one processor for executing the computer program. A nonvolatile data memory may also be provided in which the computer program may be stored, and from which the computer program may be read out by the processor for the execution.

Furthermore, the subject matter of the invention relates to a computer-readable memory medium that includes the computer program according to the invention. The memory medium is designed, for example, as a data memory such as a hard disk and/or a nonvolatile memory and/or a memory card. The memory medium may, for example, be integrated into the computer. The subject matter of the invention may likewise relate to a computer-readable memory medium that includes the trained machine learning model.

Furthermore, the particular method according to the invention may also be designed as a computer-implemented method.

Figure 1B:
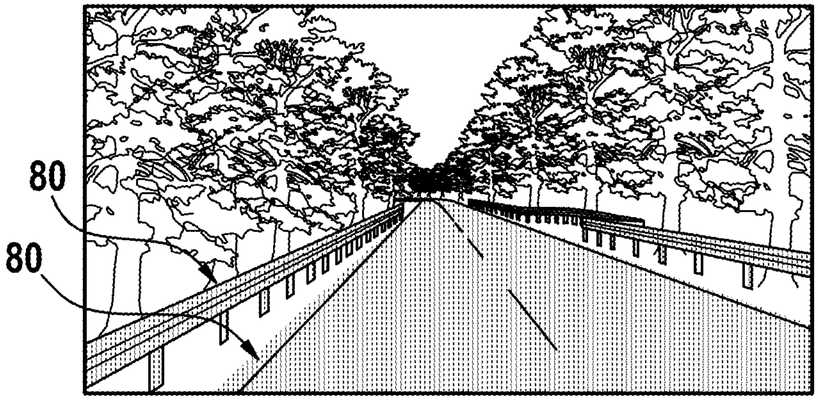
Figure 1C:
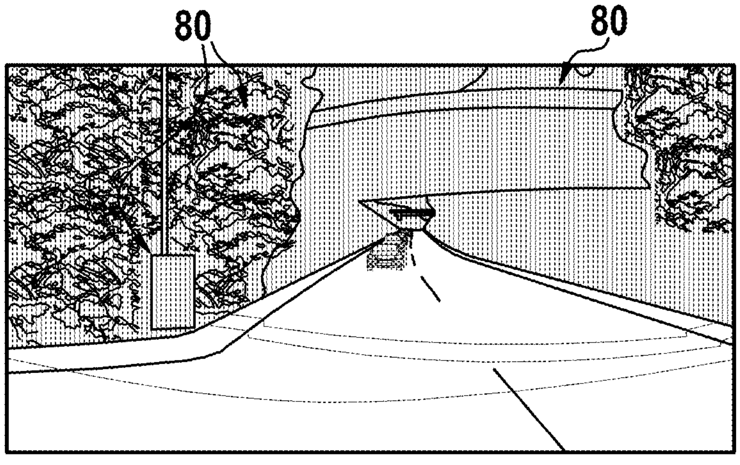
Figure 1D:
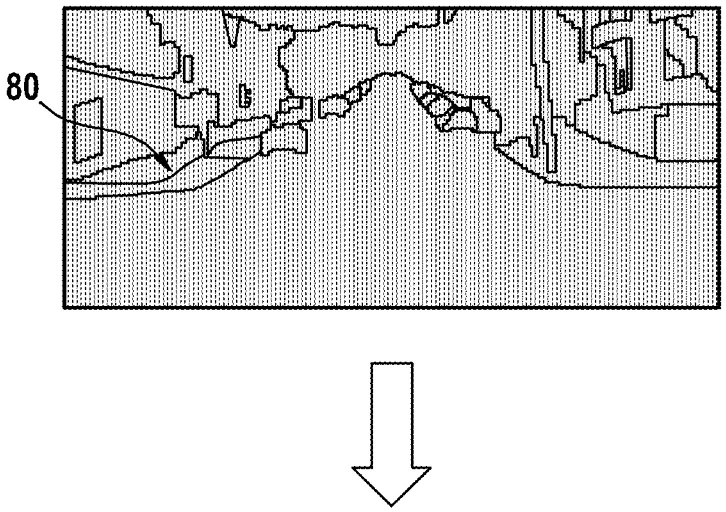
Figure 1E:
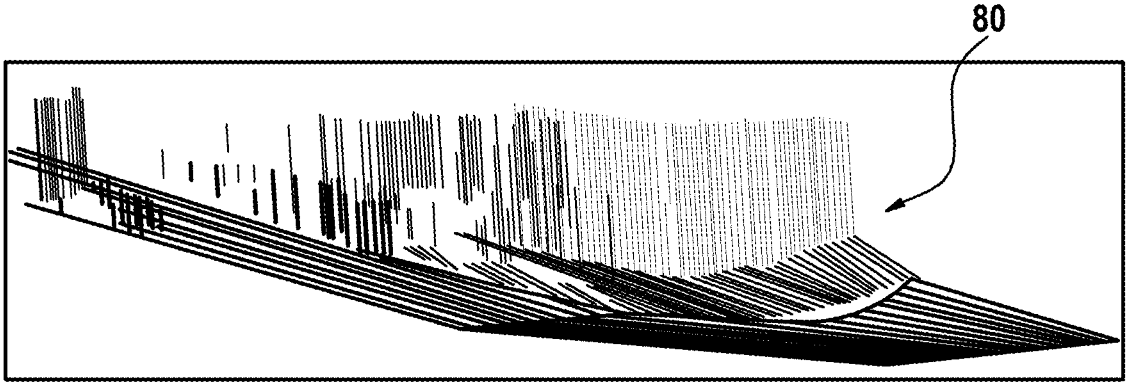
Figure 2:
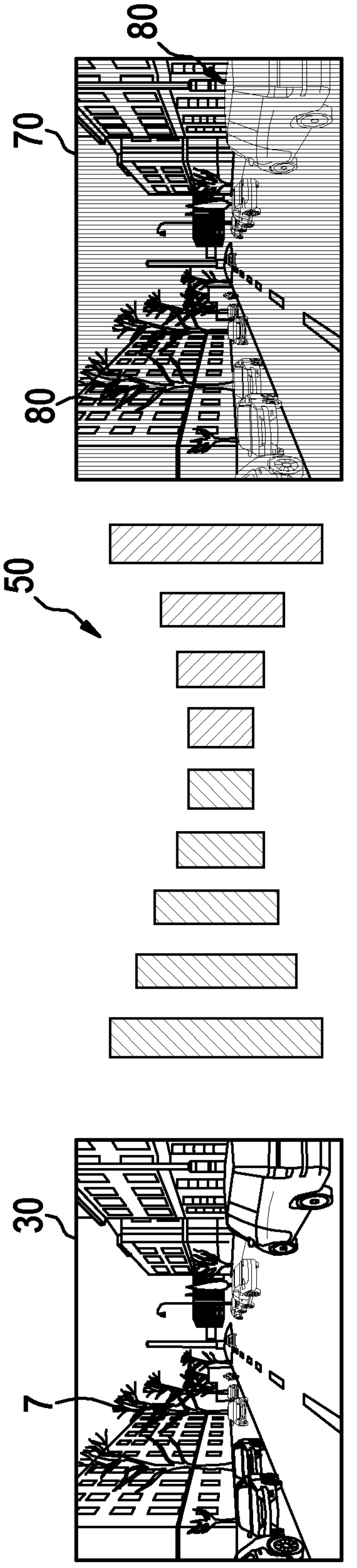
Figure 3:
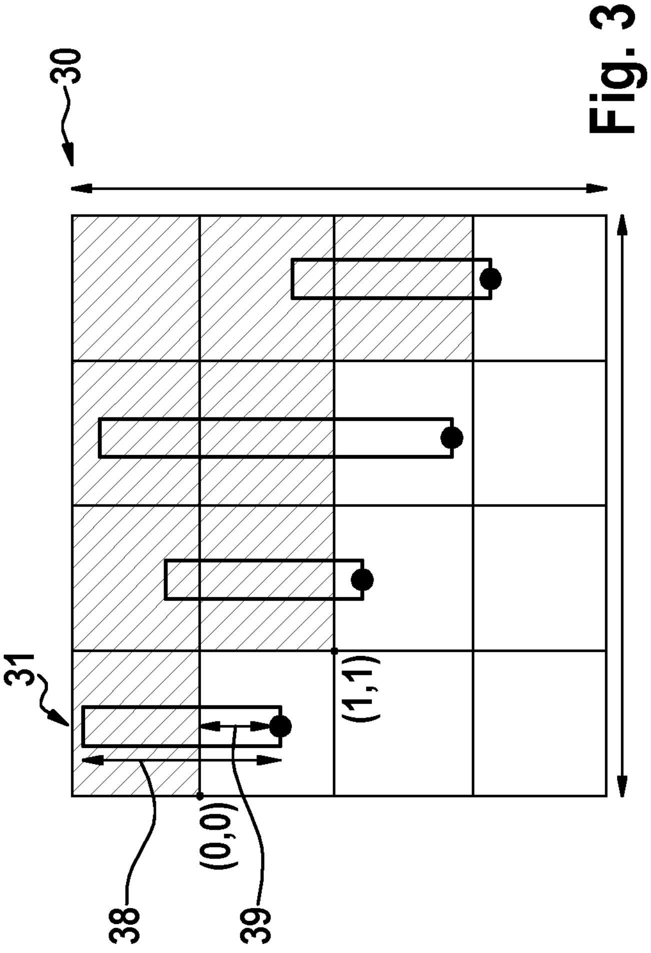
Figure 4A:
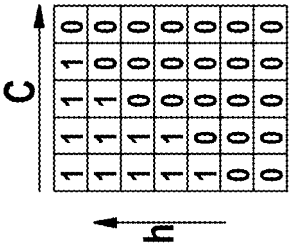
Figure 4A:
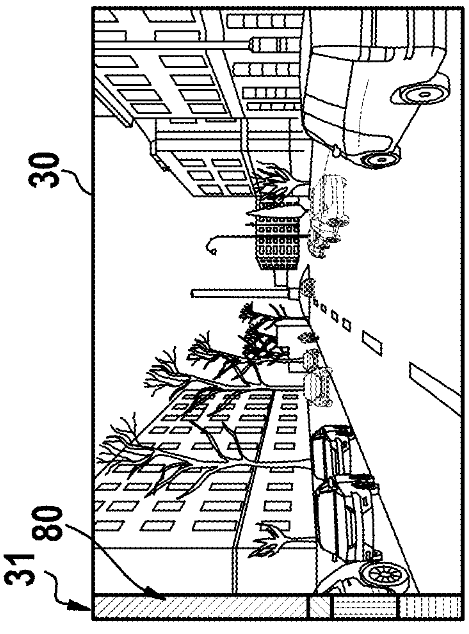
Figure 4B:
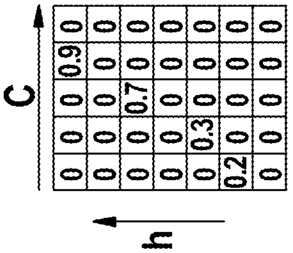
Figure 4C:
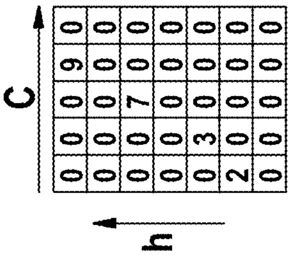
Figure 4D:
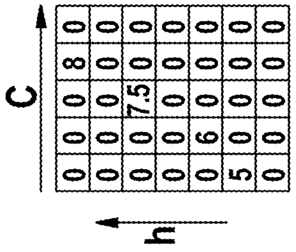
Figure 4E:
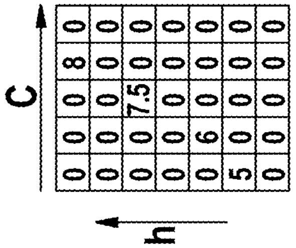
Figure 4F:
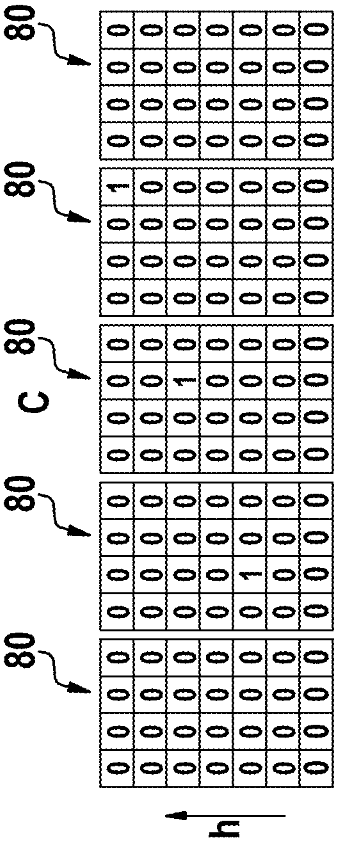
Figure 5:
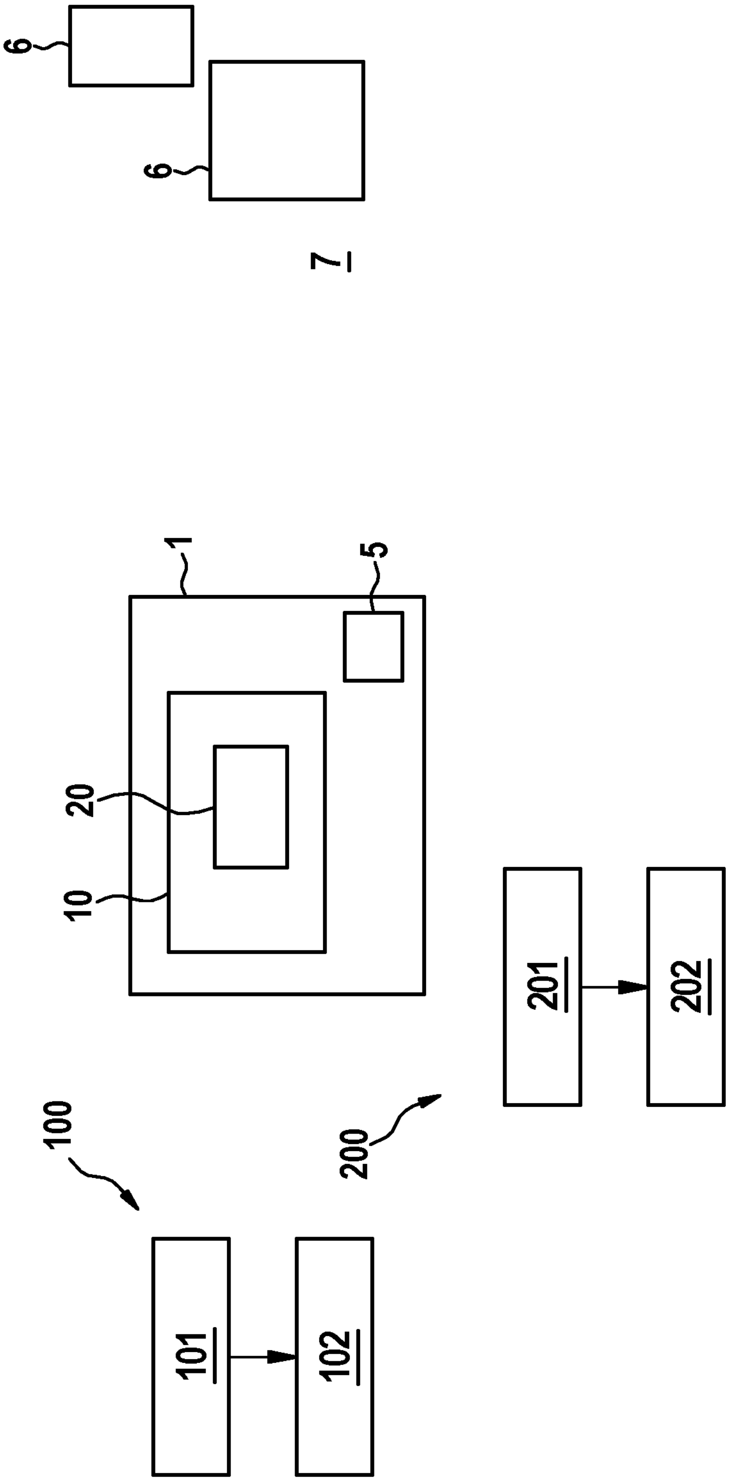

Further advantages, features, and particulars of the invention result from the following description, in which exemplary embodiments of the invention are described in detail with reference to the drawings. The features mentioned in the claims and in the description may be essential to the invention, individually or in any given combination. In the drawings:

FIG. 1A shows a schematic illustration of representations of the surroundings according to various embodiment variants of the invention in which different scalings are used, FIG. 1B further shows the schematic illustration of representations of the surroundings according to various embodiment variants of the invention in which different scalings are used, FIG. 1C further shows the schematic illustration of representations of the surroundings according to various embodiment variants of the invention in which different scalings are used, FIG. 1D further shows the schematic illustration of representations of the surroundings according to various embodiment variants of the invention in which different scalings are used, FIG. 1E further shows the schematic illustration of representations of the surroundings according to various embodiment variants of the invention in which different scalings are used, FIG. 2 shows a visualization of details of a method according to exemplary embodiments of the invention, FIG. 3 shows an example of parameterization of stixels, FIG. 4A shows an example of visualization of details of a method according to exemplary embodiments of the invention, FIG. 4B further shows the example of the visualization of details of the method according to exemplary embodiments of the invention, FIG. 4C further shows the example of the visualization of details of the method according to exemplary embodiments of the invention, FIG. 4D further shows the example of the visualization of details of the method according to exemplary embodiments of the invention, FIG. 4E further shows the example of the visualization of details of the method according to exemplary embodiments of the invention, FIG. 4F further shows the example of the visualization of details of the method according to exemplary embodiments of the invention, and FIG. 5 shows a schematic visualization of a method, a device, and a computer program according to exemplary embodiments of the invention.

In the following figures, the same reference numerals are used for identical technical features, also of different exemplary embodiments.

FIG. 1 illustrates various scaling variants of exemplary embodiments of the invention. The algorithm for generating multiple stixels for each image column may also be referred to as a multistixel approach. According to embodiment variants of the invention, multistixels may be trained in every possible combination of numbers of stixels and objects or surfaces in order to recognize various types of objects/surfaces in 3D as needed. This scaling allows the same approach to be used for various hardware (with low, medium, or high computing power) by appropriately adapting the number of stixels for each image column and the desired objects or surfaces. In FIG. 1*a*, for example objects of the elevated infrastructure and automobiles are represented by the stixels. The drivable space and the elevated object initially present are represented in FIG. 1*b*. All elevated objects as well as the sky are represented by stixels in FIG. 1*c*. A complete three-dimensional representation of the setting is provided by slanted stixels in FIGS. 1*d* and 1*e*.

FIG. 2 shows an example of a complete pipeline of embodiment variants of the invention. In the invention, a machine learning model, “model” for short, may be used to determine the representation of the surroundings. The model may be provided as a convolutional neural network (CNN). According to FIG. 2, the input for the machine learning model is a single image. The resulting output may include multiple 3D stixels that represent the (in particular complete) surroundings. (For simplification, the stixels in the background are not shown in FIG. 2). By use of the model, multiple 3D stixels for each column of the image may be output which may represent a portion of the surroundings or the entire 3D surroundings around the vehicle.

Exemplary embodiments of the invention may comprise the following steps:

According to a first step, carrying out a training of the fully convolutional CNN may be provided. In this training method according to exemplary embodiments of the invention, the number of stixels for each column of the image may initially be determined. This predetermined number of stixels may be changed for the scaling, for example for different hardware. The ordinal loss for each stixel may subsequently be applied to obtain the bottom point of the stixel. The loss for other stixel parameters may then be applied, in particular only at the locations of the output tensor at which a ground truth is present.

According to a second step, in the inference time for the resulting output tensor, the argmax operation may be applied over the two dimensions of the ordinal regression portion for each stixel to obtain the sum over the vertical columns. The computed index values may then be used to collect the vectors from the channel dimension and obtain the final stixel representation.

FIG. 3 illustrates the parameterization of a single stixel for each column with ordinal regression.

The particular representation of the stixels, as shown by way of example in FIG. 4, may be an important measure for a successful CNN training with multiple stixels. For training a fully convolutional CNN, a three-dimensional grid may advantageously be used as the coordinate grid to locate the positions of the individual bottom points of the stixels. Each stixel may be represented from the parameters bottom point, top point, at least one depth, in particular a depth of the bottom point and a depth of the top point, and semantic classes, described in greater detail below.

Bottom Point

The bottom point of the stixel may be represented as the sum of the grid coordinates and the subpixel delta lying in the interval [0,1], multiplied by the sampling factor of the resolution of the output tensor with regard to the original size of the input resolution:

$$y_{bottom} = (y_{grid} + \text{delta}_y) * \text{scale}, \quad (1)$$

where $y_{grid}$ may be the y output index of the stixel column in which the bottom point is situated, and $\text{delta}_y$ may be the shift within the grid cell in order to locate the exact position of the stixel. The latter may be necessary due to the coarse resolution. The scale may be indicated as the ratio of the height of the input tensor to the height of the output tensor:

$$\text{scale} = \frac{\text{height}_{input}}{\text{height}_{output}} \quad (2)$$

As $y_{grid}$, the rank hot encoding vector may be represented over the vertical dimension. Summation may be performed over the height (for example, [1, 1, 1, 0, 0, 0], which is index 3 in the column) to obtain the index of the y position. Such a representation may be trained as an ordinal regression task. The conventional binary cross entropy may be applied separately for each stixel. In addition, the representation may take place as a semantic segmentation task with two classes, and optimized with categorical cross entropy loss. In the second case, twice the number of channels may be obtained, for which reason the first option is preferred. $\text{Delta}_y$ may be further trained with regression, and since the spaces between the values lie in the range [0,1], the sigmoid activation may be used for the output layer of this parameter.

Top Point

The top point of a stixel may be found as follows:

$$y_{top} = y_{bottom} - a * \text{stixel}_{size} * \text{scale}, \quad (3)$$

where $y_{top}$ is the top point in pixel coordinates, and $y_{bottom}$ is the bottom point in pixel coordinates; see equation (1). a may be a manually defined scaling parameter to enhance the training of the CNN (for example, a may normally be defined as 10). The further parameter $\text{stixel}_{size}$ may indicate the size of the stixel. Scale may be defined by equation (2).

$stixel_{size}$ may be further parameterized as L1 loss regression. In FIG. 3, the size of the stixel $stixel_{size}$ is denoted by reference numeral 38, and $delta_y$ is denoted by reference numeral 39.

Depth

The depth information may be necessary for the bottom point as well as for the top point of the stixel to enable slanted stixels to be represented in 3D. L1 losses may be used for the regression or ordinal regression representation for the lowest and also the highest depth point.

The depth may be represented as the disparity:

$$\text{disparity} = \frac{1}{\text{depth}} \tag{4}$$

or as a logarithmic depth log(depth)

$$\text{output}_{depth} = \log(\text{depth}) \tag{5}$$

In the representation according to equation (4), the disparity in the CNN training increases the importance of near objects, since their disparity values are larger, while in the second representation a more uniform weighting is provided between close-range and far-range depth.

Semantic Classes

The semantic classes of each stixel may provide semantic information concerning the object.

The semantic classes may be assigned for each stixel as a hot encoding vector and trained with the conventional categorical cross entropy loss.

Each stixel may be represented with the above parameterization scheme and concatenated over the channel dimension (see FIG. 4 for an example with 5 stixels 80). The number of stixels for each column may be the parameter that is set at the start of the CNN training. A dedicated output layer of the CNN may be provided for each of the parameters (also see FIG. 4):

- a $y_{grid}$ output layer (see FIG. 4*a*) may output the tensor having the form [batch, 1 (or 2 if the representation is carried out as a semantic segmentation)*number_of_stixels, out_height, out_width], wherein no activation or sigmoid activation can be used,
- a delta_y output layer (see FIG. 4*b*) may output the form [batch, 1*number_of_stixels, out_height, out_width],
- a stixel_size output layer (see FIG. 4*c*) may output [batch, 1*number_of_stixels, out_height, out_width],
- a "depth bottom" output layer (see FIG. 4*d*) may output the form [batch, (1, or number of bins in the case of ordinal regression)*number_of_stixels, out_height, out_width],
- a "depth top" output layer (see FIG. 4*e*) may output the form [batch, (1, or number of bins in the case of ordinal regression)*number_of_stixels, out_height, out_width],
- a "semantic class" output layer (see FIG. 4*f*) may have the format [batch, number_of_classes*number_of_stixels, out_height, out_width]

In FIG. 4 the height is denoted by reference symbol "h," and the channels are denoted by reference symbol "c." Multiple stixels 80 that are concatenated over the channel dimension are illustrated In FIG. 4*f*. In addition, parameters of one of the multiple stixels 80 for each image column are provided in each channel c, in particular for various objects such as a street, a building, an empty stixel, and a vehicle in the surroundings. For assessing the losses, each tensor may be considered according to the number of stixels, and the following losses may be applied:

$$L_{y_{grid}} = \sum_{i=1}^{N} \text{binary\_cross\_entropy}\big(y_{grid_{gt}}(i),\, y_{grid_{pd}}(i)\big), \tag{6}$$

where $y_{grid_{gt}}$ is the rank hot encoding ground truth, $y_{grid_{pd}}$ is the prediction by the CNN, and N is the number of stixels. The L1 loss may be used as follows to find $delta_y$:

$$L_{delta_y} = \sum_{i=1}^{N} \|\text{delta}_{y_{gt}}(i) - \text{delta}_{y_{pd}}(i)\|_1 * M_{gt}(i), \tag{7}$$

where $delta_{y_{gt}}$ is the ground truth and $delta_{y_{pd}}$ is the CNN prediction. $M_{gt}$ is the mask with 1.0 at the position of the bottom point in the output coordinate grid, and with 0.0 everywhere else.

For the size of the stixels, the next loss may be used as follows:

$$L_{stixel_{size}} = \sum_{i=1}^{N} \|\text{stixel}_{size_{gt}}(i) - \text{stixel}_{size_{pd}}(i)\|_1 * M_{gt}(i), \tag{8}$$

where $stixel_{size_{gt}}$ is the ground truth, $stixel_{size_{pd}}$ is the CNN prediction of the stixel size, and $M_{gt}$ is the mask as described above.

$$L_{depth} = \sum_{i=1}^{N} \|\text{disparity}_{gt}(i) - \text{disparity}_{pd}(i)\|_1 * M_{gt}(i), \tag{9}$$

where disparity_gt may be the ground truth and $disparity_{pd}$ may be the CNN prediction of the disparity. Here, the disparity may be replaced by the logarithmic depth as follows:

$$L_{depth} = \sum_{i=1}^{N} \|\log(d_{gt})(i) - \log(d_{pd})(i)\|_1 * M_{gt}(i), \tag{10}$$

where $d_{gt}$ is the actual depth and $\log(d_{pd})$ is the CNN prediction of the logarithmic depth.

$$L_{classes} = \sum_{i=1}^{N} \text{categorical\_cross\_entropy}(\text{class}_{gt}(i), \text{class}_{pd}(i)) * M_{gt}(i), \tag{11}$$

where $class_{gt}$ is the ground truth and $class_{pd}$ is the CNN prediction of the class labels. In addition, the multistage gradient loss for $y_{grid}$, $stixel_{size}$, and $delta_y$, disparity (or log(d)) may be applied as follows:

$$L_{gradient} = \sum_{i=1}^{N} \sum_{h=(1,2,4,8,16)} \|g_{h_{gt}}(i) - g_{h_{gt}}(i)\| * M_{gt}(i), \tag{12}$$

where $g_{h_{gt}}$ is the gradient for the given tensor across the ground truth with step h, $g_{h_{pd}}$ is the gradient across the prediction tensor with step h, and N is the number of stixels. In addition, the gradient loss cannot be applied until after several thousand iterations, since it is scale-invariant and can lead to poor results when it is used at the very beginning of the training process. The overall loss may then be computed as follows:

$$L - w1 * L_{classes} + w2 * L_{y_{coord}} + w3 * L_{delta_y} + w4 * L_{stixel_{size}} + w5 * L_{depth} + w6 * L_{gradient}(y_{grid}) + w7 * L_{gradient}(\text{delta}_y) + w8 * L_{gradient}(\text{depth}) + w9 * L_{gradient}(\text{stixel}_{size}) \quad (13)$$

Here, the w1, w2, w3, w4, w5, w6, w7, w8, w9 weighting is used to regulate the influence of the individual loss components.

An output tensor may be obtained from the CNN at the point in time of the inference. The indices of the correct stixel positions within the grid may be computed first. In the case of the confidence tensor, for each ith stixel the following is obtained:

$$\text{position}_{idx}(i) = \text{argmax}_h(softmax_c(\text{confidence}_{tensor(i)})), \quad (14)$$

where $\text{argmax}_h$ is the argmax over the vertical dimension, and softmax_c is the softmax over the channel dimension of the confidence tensor. In the case of an ordinal regression that is represented with categorical cross entropy, the following is obtained:

$$\text{position}_{idx}(i) = \sum_{h=0}^{H} \text{argmax}_c(\text{confidence}_{tensor(i)}), \quad (15)$$

where argmax, is the argmax over the channel dimension and H stands for the vertical dimension of the tensor. Based on $\text{position}_{idx}$ (i), the correct disparity, $\text{delta}_y$, $\text{stixel}_{size}$, and the class label for each ith stixel are determined. $y_{bottom}$ and $y_{top}$ may be computed for each stixel in the column by use of equations (1) and (3).

The upper and lower depths for the ith stixels may be computed as follows:

$$\text{depth}(i) = \frac{1.0}{\frac{\text{disparity}(i)}{\text{depth}_{min}} + \frac{1.0}{\text{depth}_{max}}}, \quad (16)$$

where $\text{depth}_{min}$ and $\text{depth}_{max}$ are, for example, scalar values of the expected minimum and maximum depth range in meters. In the case of the logarithmic depth representation, the depth for the ith pixel may be computed as follows:

$$\text{depth}(i) = \exp(\log(d)\,(i)), \quad (17)$$

where log(d) is the logarithmic depth output of the CNN.

The "semseg" class for the ith stixel may be computed as follows:

$$\text{class}(i) = \text{argmax}_c(softmax_c(\text{label}_{tensor(i)})), \quad (18)$$

where $\text{argmax}_c$ and $\text{softmax}_c$ are the argmax and softmax operations over the channel dimensions. In addition, for unused stixels (see the empty stixels according to FIG. 4), $y_{bottom}$=0 is possible, beginning in the highest row of the image, and all other entries may therefore be ignored.

FIG. 5 illustrates a method 100 according to exemplary embodiments of the invention for generating a representation 70 of the surroundings. According to a first method step 101, at least one or exactly one image 30 which may result from a recording by an image detection device 5 and which represents objects 6 and/or surfaces 6 in the surroundings 7 of the image detection device 5 is provided, in particular determined. The provided image 30 may be subdivided into multiple image columns 31, as shown by way of example in FIG. 3. According to a second method step 102, the representation 70 of the surroundings may be subsequently generated, for this purpose it being possible to parameterize, in three-dimensional space, multiple three-dimensional stixels 80 for each image column 31 of the provided image 30 for representing the objects 6 and/or surfaces 6. The generation 102 of the representation 70 of the surroundings may take place using a model 50 that uses the provided image 30 as input (see FIG. 2). It is also possible to automatedly and preferably autonomously control a vehicle 1 based on an automated evaluation of the representation 70 of the surroundings, wherein the image detection device 5 in the form of a camera 5 is mounted on the vehicle 1.

FIG. 5 likewise illustrates a training method 200, a computer program 20, and a device 10 according to exemplary embodiments of the invention. The training method 200 may include a first training step 201 in which an image 30 is provided. According to a second training step 202, the training of the machine learning model 50 may then be carried out, in particular according to an end-to-end training using the provided image 30 as input. The training may use a ground truth as described above.

In the above explanation of the embodiments, the present invention is described solely in terms of examples. Of course, individual features of the embodiments, if technically feasible, may be freely combined with one another without departing from the scope of the present invention.

The invention claimed is:

1. A method for generating a representation of the surroundings, comprising the following steps:

providing at least one image that results from a recording by an image detection device, and that represents objects and/or surfaces in the surroundings of the image detection device, wherein the provided image is subdivided into multiple image columns, and generating the representation of the surroundings, wherein for this purpose multiple three-dimensional stixels for each image column of the provided image are parameterized for representing the objects and/or surfaces in three-dimensional space, characterized in that the generation of the representation of the surroundings takes place using a model which uses the provided image as input, and wherein the three-dimensional stixels are designed as slanted stixels, the particular image column extending across multiple pixels of the provided image in the horizontal direction of the provided image, and in the vertical direction of the provided image, at least two stixels being provided for each image column.

2. The method according to claim 1, characterized in that the model is designed as an end-to-end machine learning model, preferably as a neural network, preferably as a convolutional neural network.

3. The method according to claim 1, characterized in that the parameterization of the stixels takes place by defining the particular stixel by a bottom point and a top point, to which a piece of depth information concerning a distance of the object represented by the stixel and/or of the surface represented by the stixel is assigned in each case.

4. The method according to claim 1, characterized in that the steps are carried out for further provided images that result from a recording of further regions of the surroundings by further image detection devices in order to expand the representation of the surroundings to the further regions.

5. The method according to claim 1, characterized in that the model comprises an output layer for each parameter of the particular stixel, preferably for a bottom point and/or a top point and/or for a piece of depth information for the particular point and/or a stixel size and/or at least one semantic class of the particular stixel, wherein at least one of the following output layers is provided:

an output layer for parameterization of the bottom point of the stixel, an output layer for parameterization of the depth information for the bottom point, an output layer for parameterization of the depth information for the top point of the stixel, an output layer for parameterization of the stixel size of the stixel, an output layer for parameterization of the at least one semantic class of the stixel.

6. The method according to claim 1, characterized in that based on an at least semiautomated evaluation of the generated representation of the surroundings, an at least semiautonomous robot, in particular a vehicle, is controlled, preferably in an at least semiautomated manner and preferably autonomously, the image detection device preferably being designed as a camera.

7. A method for training a machine learning model for generating a representation of the surroundings, comprising the following steps:

providing an image, which represents objects and/or surfaces in the surroundings, carrying out the training of the machine learning model, in which the provided image is used as input for the machine learning model in order to train the machine learning model for an output of multiple three-dimensional stixels for each image column of the provided image, the stixels representing the objects and/or surfaces in three-dimensional space, wherein the machine learning model is trained end-to-end, and wherein the three-dimensional stixels are designed as slanted stixels, the particular image column extending across multiple pixels of the provided image in the horizontal direction of the provided image, and in the vertical direction of the provided image, at least two stixels being provided for each image column.

8. The method according to claim 7, characterized in that an ordinal regression is used for the parameterization of the particular stixels, preferably to determine a bottom point and/or top point of the stixel.

9. The method according to claim 7, characterized in that the trained machine learning model for generating the representation of the surroundings is used as the model.

10. A non-transitory computer-readable medium that includes commands which, when the commands are executed by a computer, prompt the computer to:

provide at least one image that results from a recording by an image detection device, and that represents objects and/or surfaces in the surroundings of the image detection device, wherein the provided image is subdivided into multiple image columns, and generate the representation of the surroundings, wherein for this purpose multiple three-dimensional stixels for each image column of the provided image are parameterized for representing the objects and/or surfaces in three-dimensional space, characterized in that the generation of the representation of the surroundings takes place using a model which uses the provided image as input, and wherein the three-dimensional stixels are designed as slanted stixels, the particular image column extending across multiple pixels of the provided image in the horizontal direction of the provided image, and in the vertical direction of the provided image, at least two stixels being provided for each image column.

11. A device for data processing comprising:

a processor;

a memory communicatively coupled to the processor and storing a computer program, that when executed by the processor, causes the processor to:

provide at least one image that results from a recording by an image detection device, and that represents objects and/or surfaces in the surroundings of the image detection device, wherein the provided image is subdivided into multiple image columns, and generate the representation of the surroundings, wherein for this purpose multiple three-dimensional stixels for each image column of the provided image are parameterized for representing the objects and/or surfaces in three-dimensional space, characterized in that the generation of the representation of the surroundings takes place using a model which uses the provided image as input, and wherein the three-dimensional stixels are designed as slanted stixels, the particular image column extending across multiple pixels of the provided image in the horizontal direction of the provided image, and in the vertical direction of the provided image, at least two stixels being provided for each image column.

* * * * *